(12) United States Patent
Mang et al.

(10) Patent No.: US 10,767,781 B2
(45) Date of Patent: Sep. 8, 2020

(54) SPOOL VALVE HAVING A CHANNEL

(71) Applicant: SVM Schultz Verwaltungs-GmbH & Co. KG, Memmingen (DE)

(72) Inventors: Helmut Mang, Memmingen (DE); Florian Schreiber, Weissenhorn (DE)

(73) Assignee: SVM Schultz Verwaltungs-GmbH & Co. KG, Memmingen (DE)

( * ) Notice: Subject to any disclaimer, the term of this patent is extended or adjusted under 35 U.S.C. 154(b) by 0 days.

(21) Appl. No.: 15/853,625

(22) Filed: Dec. 22, 2017

(65) Prior Publication Data

US 2018/0180193 A1 Jun. 28, 2018

(30) Foreign Application Priority Data

Dec. 23, 2016 (DE) .................. 10 2016 125 692
Mar. 31, 2017 (DE) .................. 10 2017 107 045

(51) Int. Cl.
| | |
|---|---|
| *F16K 11/07* | (2006.01) |
| *F16K 27/04* | (2006.01) |
| *F16H 61/02* | (2006.01) |
| *F16K 31/06* | (2006.01) |
| *G05D 16/20* | (2006.01) |

(52) U.S. Cl.
CPC ..... *F16K 31/0613* (2013.01); *F16H 61/0251* (2013.01); *F16K 11/07* (2013.01); *F16K 27/041* (2013.01); *F16H 2061/0253* (2013.01); *G05D 16/2013* (2013.01)

(58) Field of Classification Search
CPC .... F16K 27/041; F16K 31/0613; F16K 11/07; F16K 11/0716; F16H 2061/0253
See application file for complete search history.

(56) References Cited

U.S. PATENT DOCUMENTS 4,809,749 A * 3/1989 Ichihashi ............ F16K 31/0613
137/625.65
4,947,893 A * 8/1990 Miller ................. F16H 61/0021
137/625.65

(Continued)

FOREIGN PATENT DOCUMENTS

DE 3633312 A1 4/1988
DE 19733660 A1 2/1999

(Continued)

*Primary Examiner* — Seth W. Mackay-Smith
(74) *Attorney, Agent, or Firm* — Loginov & Associates, PLLC; William A. Loginov

(57) ABSTRACT

A spool valve, in particular for an automatic transmission of a motor vehicle, having a valve housing, which houses a guide element, in which an axially movable valve spool is arranged, and the valve housing having at least one radial pressure connection and a radial tank connection being axially distanced therefrom, and a frontal working connection. The guide element has at least one pressure connection opening connected to the pressure connection and one tank connection opening, axially distanced therefrom and connected to the tank connection and one working connection opening, which is axially positioned between the pressure connection opening and the tank connection opening and is connected to the working connection. In the valve housing a partially axially extending connection duct is present, which connects the working connection opening to the working connection.

15 Claims, 1 Drawing Sheet

(56) References Cited

U.S. PATENT DOCUMENTS

| | | | | |
|---|---|---|---|---|
| 5,163,477 | A * | 11/1992 | Takano | F16K 31/0613 |
| | | | | 137/625.65 |
| 5,186,204 | A * | 2/1993 | Oka | F16H 61/0251 |
| | | | | 137/238 |
| 5,984,259 | A * | 11/1999 | Najmolhoda | G05D 16/2024 |
| | | | | 251/50 |
| 6,179,005 | B1 * | 1/2001 | Inami | F16K 31/0613 |
| | | | | 137/625.65 |
| 6,581,634 | B2 * | 6/2003 | Najmolhoda | F16K 31/0613 |
| | | | | 137/544 |
| 6,832,631 | B2 * | 12/2004 | Armando | C03B 9/406 |
| | | | | 137/625.65 |
| 6,968,813 | B2 * | 11/2005 | Isobe | F16K 31/0613 |
| | | | | 123/198 F |
| 7,192,005 | B2 * | 3/2007 | Denyer | F16K 31/0613 |
| | | | | 137/625.64 |
| 7,748,408 | B2 * | 7/2010 | Voss | F16K 27/041 |
| | | | | 137/625.27 |
| 8,991,428 | B2 * | 3/2015 | Holmes | F16K 31/0613 |
| | | | | 137/625.65 |
| 9,915,276 | B2 * | 3/2018 | Bruck | F15B 13/0433 |
| 2011/0240894 | A1 * | 10/2011 | Yasoshima | F15B 13/0402 |
| | | | | 251/129.15 |
| 2015/0176700 | A1 * | 6/2015 | Schudt | F16H 61/0206 |
| | | | | 137/625.65 |
| 2016/0305566 | A1 * | 10/2016 | Eszterle | F16K 11/07 |

FOREIGN PATENT DOCUMENTS

| | | |
|---|---|---|
| DE | 10255414 A1 | 6/2004 |
| DE | 102014210530 A1 | 12/2015 |
| JP | 07208634 A | 8/1995 |
| WO | 2015055340 A1 | 4/2015 |

* cited by examiner

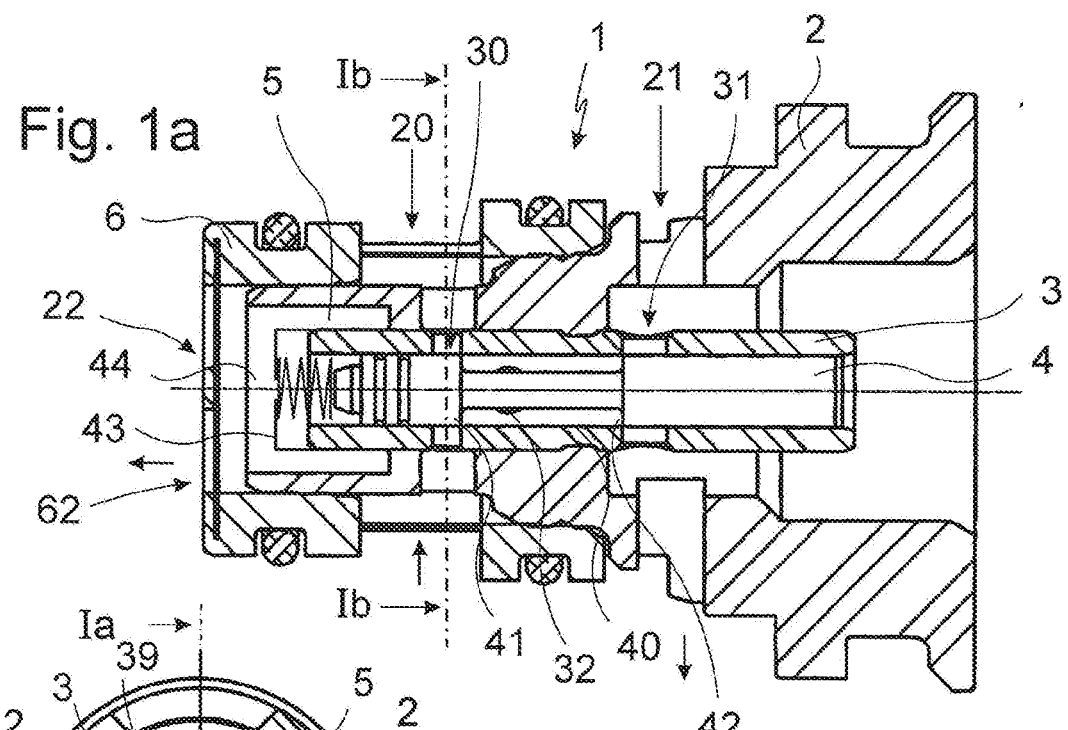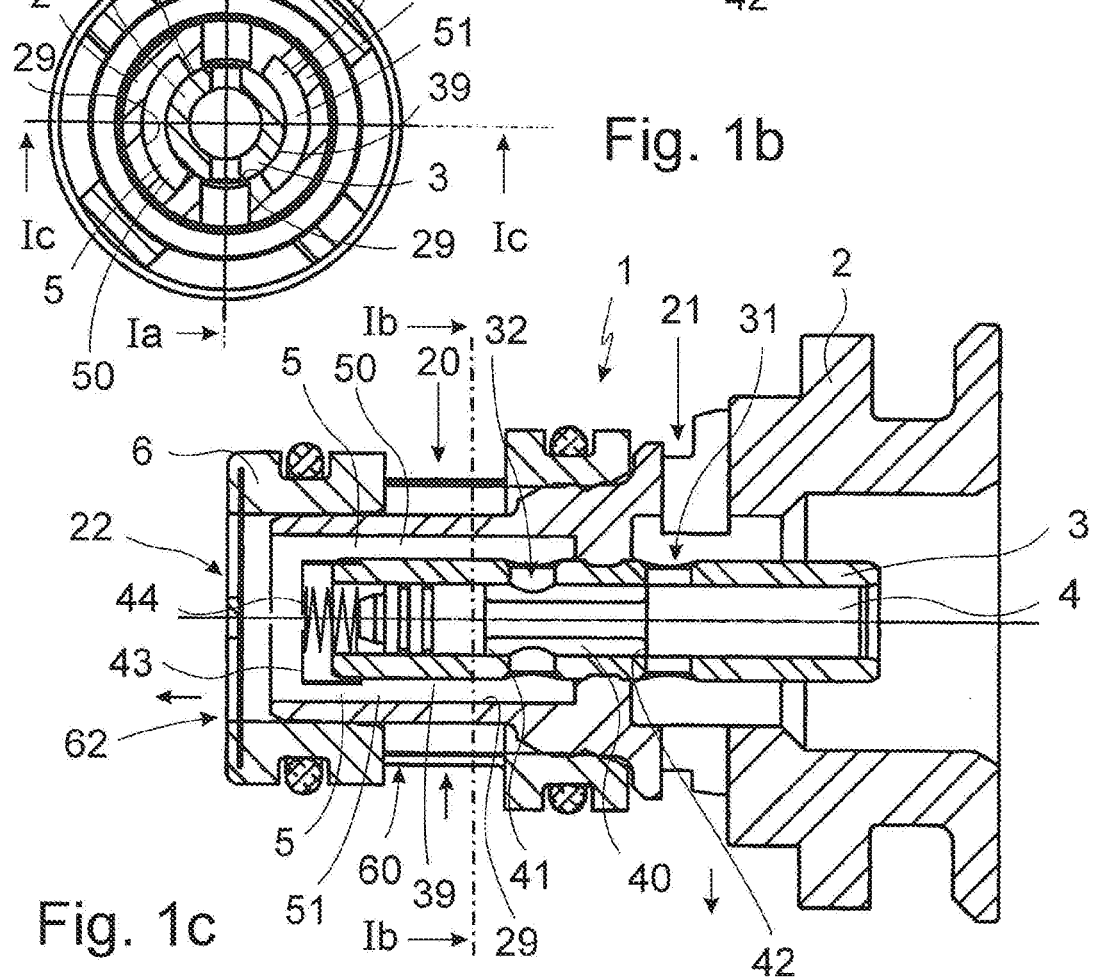

SPOOL VALVE HAVING A CHANNEL

BACKGROUND OF THE INVENTION

The invention refers to a spool valve, in particular for an automatic transmission of a motor vehicle, having a valve housing, which houses a guide element, in which an axially movable valve spool is arranged, and the valve housing having at least one radial pressure connection and a radial tank connection being axially distanced therefrom, and a working connection, wherein on the guide element' at least one pressure connection opening connected to the pressure connection and one tank connection opening, axially distanced therefrom and connected to the tank connection and one working connection, which is axially positioned between the pressure connection opening and the tank connection opening and is connected to the working connection are provided, and wherein in the valve housing a partially axially extending connection duct is present, which connects the working connection opening to the working connection.

A spool valve of above mentioned kind is known from WO 2015/055340, for example. In this disclosure, the guide element, the spool sleeve, is completely injection coated by the plastic material of the valve housing. Thus, also the channel is delimited on all sides by plastic material. The injection molding tool which is used to this end is complex, thus increasing the cost of production of such a spool valve. At the same time, the flow cross-section of this invention is relatively small, causing relatively high-pressure losses during operation.

Also, Japanese patent application JP-H07206634 discloses a spool valve according to the state of the art, in which the guide element has a complex structure, since a plurality of channels is provided in the same, and their production is onerous.

BRIEF SUMMARY OF THE INVENTION

The object of the invention is to improve this state of the art.

Based on a spool valve, as the one previously described, the invention proposes that the channel is delimited radially inwards by the outer wall of the guide element and radially outwards by an inner wall of the valve housing.

The guide element normally is composed of a different material than the valve housing. The channel of the invention is thus delimited by elements made of different materials. The first advantage is that the manufacturing of an inventive spool valve is less onerous, since the inventive spool valve may be produced with simpler injection molding tools, having no movable spools.

In above mentioned state of the art of WO 2015/055340, the guide element is injection-coated on its outer side by the plastic material of the valve housing. Due to wall thickness applied on the outer side of the guide element a smaller cross-sectional surface of channel is available with respect to the inventive embodiment, having the same construction and outer diameter.

In the inventive solution, less injection molding material is used, thus reducing the manufacturing costs.

The inventive proposal, which ultimately causes an increase of the cross-sectional surface of channel, considerably improves the hydraulic properties of the inventive spool valve.

The inventive spool valve allows smaller pressure drops with the same outer dimensions, which is convenient for the energy consumption and efficiency of a plant, in which such a spool valve is used. This is due to the fact that the inventive spool valve provides larger flow cross-sections with the same outer dimensions. The inventive proposal makes clever use of the delimitation wall of elements which are already present in the spool valve.

The inventive proposal thus allows an operation of inventive spool valves at higher pressures or with smaller constructions; with the same operating parameters. The field of application of such inventive spool valves is considerably expanded.

The same effect is provided to the skilled in the art when the outer wall of the guide element is provided with a coating or protective layer, so that the blank metal is protected by suitable means.

The invention also comprises the fact that the guide element is preferably formed by a spool sleeve which is made of metal, in which the pressure connection opening, the tank connection opening and the working connection opening are formed.

It is to be noted that the liquid or gaseous medium to be controlled, preferably the hydraulic oil of the automatic gearbox of a motor vehicle, flows into the spool valve at the pressure connection and exits the spool valve from the tank connection or working connection. It is also to be noted that the medium to be controlled flows into the guide element from the pressure connection opening and exits the guide element again from the tank connection or working connection opening.

In a preferred embodiment the channel is delimited, at the height of the pressure connection opening, radially inwards by the outer wall of the guide element and radially outwards by an inner wall of the valve housing.

In a preferred embodiment of the inventive spool valve, the sequence (in axial direction, referred to the direction of movement of the valve spool) of connections on the valve housing differs from the sequence of corresponding openings on the guide element, which are connected to the connections.

Thus, for example, the following sequence of connections is provided: working connection—pressure connection—tank connection. On the guide element, the following sequence of openings is provided, for example: pressure connection opening—working connection opening—tank connection opening.

With this particular choice of connections, the connection lines ultimately intersect between the respective connections and openings of pressure connection and working connection. Due to the here proposed constructive solution, in which the channel is delimited, at the height of the pressure connection opening, radially inwards by the outer wall of the guide element and radially outwards by an inner wall of the valve housing, a considerable amount of space is saved while still providing a sufficiently large cross-section for the flow of medium to be controlled.

In a preferred embodiment, the guide element is a component which is separate from the valve housing.

Moreover, the outer wall of the guide element is made of metal.

In an advantageous embodiment, the valve housing and its inner wall too are made of plastic, in particular an injection molded plastic material, which surrounds the guide element.

Injection moldable plastic materials are already known to the skilled in the art. These are often thermoplastic materials. The plastic materials used herein may also be reinforced by (glass- or carbon-) fibers or pearls.

Ingenious is the fact that the valve housing is provided, at its axial end, with a filter cage, in which also the working connection opens and the filter cage has a first passage opening for the working connection.

Alternatively, the filter cage may also be integrally formed in the valve housing.

In a further preferred embodiment the filter cage has a radially positioned second passage opening for the pressure connection.

Moreover, the valve spool advantageously has a passage channel, which is delimited by a first and second control edge.

The passage channel is defined by a tapering on the valve spool. The resulting construction is compact.

It is advantageous that the end of the guide element which is facing the filter cage is freed from the plastic material of the valve housing and this end supports an abutment cap, against which the return spring acting on the valve spool abuts.

The abutment cap is pressed or inserted onto the guide element. It defines a precise location for the return spring even in case of temperature variations. At least one passage opening for a pressure compensation between the inside of the sleeve and the working connection (preferably in the bottom of the hat-shaped abutment cap) is provided, whereby a fast switching motion of the valve spool is facilitated.

The proposal also advantageously foresees that the channel comprises at least one axial partial channel, which, with respect to the pressure connection and/or the tank connection, is offset by 90° in the circumferential direction.

The term "circumferential direction" is to be conceived as directed in the direction of the circumference, with respect to the central axis of the valve spool (which is parallel to its longitudinal mobility).

In a preferred embodiment of this proposal the axial partial channel is at least partially provided with a cross-section which has approximately the shape of a circular segment or a crescent.

Moreover, an electromagnetic unit is provided, the armature of which acts on the valve spool, against the force provided by the return spring.

In an advantageous embodiment, the guide element has a flattening or cavity, and the flattening or cavity are part of the channel or of the at least one of axial partial channels.

Moreover, a radial pressure connection is provided on the valve housing. The location of the different connections may be considerably modified within the proposal. The connections may for example be provided once or even multiple times on the front side of the valve housing, on the open side of the guide element. A part or even all connections may however be radially positioned on the valve housing, with respect to the motion direction of the valve spool.

Thus, for example, in an advantageous embodiment, a radial tank connection is provided on the valve housing.

It is ingenuous that a frontal working connection is provided on the valve housing.

The proposal also comprises the fact that the axially extending channel directly opens into the frontal working connection. This allows a very compact construction.

The invention also comprises an automatic transmission provided with such a spool valve.

BRIEF DESCRIPTION OF THE DIFFERENT VIEWS IN THE DRAWING

In the drawing, the invention is schematically shown, in particular in an exemplary embodiment. In particular:

FIGS. 1a and 1c show, in a respective longitudinal section, the inventive spool valve, wherein the section planes are rotated by 90° with respect to each other, see FIG. 1b.

FIG. 1b shows a cross-section of the inventive spool valve of FIGS. 1a and 1c, with corresponding section lines Ia-Ia and Ic-Ic.

DETAILED DESCRIPTION OF THE PREFERRED EMBODIMENT

FIG. 1a and FIG. 1c show the inventive spool valve 1 in two different sectional views, which are rotated by 90°. Since the inventive proposal is particularly clearly visible in FIG. 1c, the spool valve 1 is initially described based on this figure.

The spool valve 1 is located inside a valve housing 2. The valve housing 2 is connected to an actuation unit, herein for example an electromagnetic unit, not shown, which in the situation show, is connected to the right side of valve housing 2. The valve housing 2 has a pressure connection 20 and a tank connection 21, which are positioned on the valve housing 2, in a radial position, with respect to the longitudinal extension of the valve housing 2 or the direction of motion of valve spool 4 (wherein radial means perpendicular). The direction of flow of fluid is indicated by an arrow. The fluid such as hydraulic oil, flows through the pressure connection 20 into the spool valve 2 and exits the same, according to the adjustment position of the valve spool 4, from the frontal working connection 22 or flows through the tank connection 21 back to the reservoir tank.

The arrangement chosen is such that the pressure connection 20 is positioned on the valve housing 2 between the tank connection 21 and the working connection 22, wherein the working connection 22 is provided frontally on the valve housing 2, so that the flow direction of outgoing fluid is perpendicular to the flow direction of fluid flowing in pressure connection 20.

In the valve housing 2, the guide element 3 is supported. The guide element 3 usually is a spool sleeve 38 made of metal. The valve housing 2 is made of plastic, which is injected in an injection molding method around the guide element 3, wherein the guide element 3 has several openings which are not covered by the plastic material of the valve housing 2. The guide element 3 is not entirely injection-coated leaving its outer wall 39 acting as a delimiting wall 29 of a channel 5.

The sleeve-shaped guide element 3 has both side ends open and is provided on its lateral surface with a plurality of radially located openings, which penetrate completely through the material thickness of the sleeve. On the read side of the guide element 3/of the spool sleeve 38 facing the electromagnetic unit the tank connection opening 31 is positioned, which is hydraulically connected to the tank connection 21. The connection element between the tank connection opening 31 and the tank connection 21 extends essentially radially, with respect to the longitudinal mobility of valve spool 4. In the axial direction, relative to longitudinal mobility of valve spool 4, at a greater distance from the electromagnetic unit, almost at the other end (in the last third) of the guide element 3/the spool sleeve 38, the pressure connection opening 30 is provided on the guide element 3/the spool sleeve 38, which opening is hydraulically connected to the pressure connection 20. Also, the connection element between the pressure connection opening 30 and the pressure connection 20 is essentially radially oriented with respect to the longitudinal mobility of the valve spool 4.

Between the pressure connection opening 30 and the tank connection opening 3 on the guide element 3/the spool sleeve 38, the working connection opening 32 is almost centrally provided. The working connection opening 32 is connected to the working connection 22 forward positioned, in a frontal position on the side of valve housing 2 opposed with respect to the electromagnetic unit through channel 5 which extends in the axial direction (with respect to longitudinal mobility of valve spool 4).

In order to avoid a collision with the radially extending connection element between the pressure connection 20 and the pressure connection opening 30, the channel 5 is not disposed in the entire circular ring, but only in a segment of a circular ring, as shown in FIG. 1b, for example.

In the guide element 3/spool sleeve 38 the valve spool 4 is supported in a longitudinally movable way. On the rear side, on the side opposite with respect to the working connection 22, the valve spool 4 interacts with an armature, not shown, of the electromagnetic unit. On the opposed front end of the valve spool 4, the latter has a conical shape, and on this cone the return spring 44 abuts. Ingenuously, it is foreseen, that on the cylindrical valve spool 4 a tapering is provided, which thus defines a flow channel 40, which is delimited in the direction of the working connection 22 by a first control edge 41 and on the rear side by a second control edge 42. This very slim construction increases compactness, since the required flow channel 40 between the different openings, the pressure connection opening 30, the tank connection opening 31 and the working connection opening 32, is not positioned in the wall of the guide element 3/spool sleeve 38. Such a proposal allows a compact construction.

It has already been noted that the guide element 3/spool sleeve 38 are not entirely injection-coated by the plastic material of the valve housing 2, whereas in particular the anterior region facing the working connection 22 of the guide element 3 is free or blank.

This constructive form initially allows that for channel 5 a large flow cross-section is available, since channel 5 is delimited by the outer wall 39 of guide element 3/spool sleeve 38. An additional plastic material at this point would be detrimental, since it only reduces the flow cross-section and thus increases the pressure drop or pressure loss. Moreover, on the metal end of the guide element 3/spool sleeve 38 an abutment cap 43 is applied, pressed or inserted, in each case fixed, wherein on its bottom the return spring 44 abuts, which is inserted on the cone of the valve spool 4.

Since in this case, an abutment cap 43 made of metal, such as steel, is inserted on the guide element 3, which is preferably made of metal, such as steel, (by pressing), the temperature behavior is already well known and thus a high operating security is given, that on these elements the return spring 44, which defines the position of the valve spool 4 relative to the different openings, with a corresponding electrification, is supported.

At the end, on the side of valve housing 2 opposed with respect to the electromagnetic unit a filter cage 6 is inserted, or pressed. The filter cage ends, in the direction of the electromagnetic unit between the tank connection 21 and the pressure connection 20. The filter cage 6 has passage openings 60, 62, which are coated by a filter tissue and thus provide a filtering function and prevent metal scraps to reach the sensitive inner space of the valve housing 2. The passage opening 60 is associated to the pressure connection 20, on the bottom of the pot-like filter cage 6 the passage opening 62, also covered by filtering tissue is provided, which covers the working connection 22. In addition, the filter cage 6 supports on its outer side two O-ring sealing, in order to seal in the mounted situation.

In figures, the same or corresponding elements are indicated by the same references and are thus not described again, unless useful. The disclosures provided in the entire description may be logically transferred also to same parts having the same reference numerals or the same component definitions. The location data selected in the description, such as up, down, side, etc., are referred to the directly described and represented figure and have to be logically transferred in case of a change of position. Moreover, even single characteristics or combinations of characteristics of the embodiments shown and described may represent their own inventive solutions.

Although the invention has been described by means of precise exemplary embodiments, which have been exposed up to the tiniest detail, it is to be noted that this has only been made for clarity and that the invention is not necessarily limited to these embodiments, since alternative examples and procedures are known to the skilled in the art by reading the disclosure. Consequently, modifications are considered, which may be introduced, without deflecting from the content of the described invention.

The invention claimed is:

1. A spool valve, comprising:
a valve housing, which houses a guide element, in which an axially movable valve spool is arranged, and the valve housing having at least one radial pressure connection and a radial tank connection being axially distanced therefrom, and a working connection, wherein the guide element has at least one pressure connection opening connected to the pressure connection, and the guide element has one tank connection opening, axially distanced from the pressure connection opening and connected to the tank connection, and the guide element has one working connection opening, which is axially positioned between the pressure connection opening and the tank connection opening, and the working connection opening is connected to the working connection, and wherein in the valve housing a partially axially extending connection channel is present, which connects the working connection opening to the working connection, and wherein the connection channel is delimited radially inwards by the outer wall of the guide element and radially outwards by an inner wall of the valve housing, and the connection channel comprises at least one axial partial channel, which, with respect to the pressure connection or the tank connection, is offset by 90° in the circumferential direction, and the axial partial channel at least partially defining a cross-section which has approximately the shape of a circular segment or a crescent, wherein the connection channel is delimited at a height of the pressure connection opening from an axial end of the valve housing, radially inwards by the outer wall of the guide element and radially outwards by an inner wall of the valve housing.

2. The spool valve of claim 1, wherein the guide element comprises a spool sleeve which is made of metal, wherein the pressure connection opening, the tank connection opening and the working connection opening are formed in the spool sleeve.

3. The spool valve of claim 1, wherein the guide element is a component which is formed separately from the valve housing.

4. The spool valve of claim 1, wherein the outer wall of the guide element comprise metal.

5. The spool valve of claim 1, wherein the valve housing, and an inner wall comprise plastic.

6. The spool valve of claim 5 wherein the valve housing, and the inner wall thereof, are made of an injection molded plastic material, which surrounds the guide element.

7. The spool valve of claim 1, wherein the valve housing is provided, at its axial end, with a filter cage, into which the working connection opens out, and wherein the filter cage has a first passage opening for the working connection.

8. The spool valve of claim 7, wherein the filter cage has a radially positioned second passage opening for the pressure connection.

9. The spool valve of claim 7, wherein an end of the guide element which is facing the filter cage is free of the plastic material of the valve housing, and wherein the end of the guide element which is facing the filter cage supports an abutment cap, against which a return spring acting on the valve spool abuts.

10. The spool valve of claim 1, wherein the valve spool is provided with a flow channel, which is delimited by the first and second control edge.

11. The spool valve of claim 1, further comprising an electromagnetic unit, having and armature that acts on the valve spool, against the force provided by the return spring.

12. The spool valve of claim 1, wherein the axial connection channel directly opens into a frontal working connection.

13. The spool valve of claim 1, further comprising a frontal working connection on the valve housing.

14. The spool valve of claim 1 wherein the spool valve is constructed and arranged to mount in an automatic transmission of a motor vehicle.

15. A spool valve, comprising:
a valve housing, which houses a guide element, in which an axially movable valve spool is arranged, and the valve housing having at least one radial pressure connection and a radial tank connection being axially distanced therefrom, and a working connection, wherein the guide element has at least one pressure connection opening connected to the pressure connection, and the guide element has one tank connection opening, axially distanced from the pressure connection opening and connected to the tank connection, and the guide element has one working connection opening, which is axially positioned between the pressure connection opening and the tank connection opening, and the working connection opening is connected to the working connection, and wherein in the valve housing a partially axially extending connection channel is present, which connects the working connection opening to the working connection, and wherein the connection channel is delimited radially inwards by the outer wall of the guide element and radially outwards by an inner wall of the valve housing, and the connection channel comprises at least one axial partial channel, which, with respect to the pressure connection or the tank connection, is offset by 90° in the circumferential direction, and the axial partial channel at least partially defining a cross-section which has approximately the shape of a circular segment or a crescent, wherein the connection channel is delimited, at a radius extending through the pressure connection opening, radially inwards by the outer wall of the guide element and radially outwards by an inner wall of the valve housing.

* * * * *